Dec. 11, 1951   E. O. PRATT   2,578,374
APPARATUS FOR HANDLING IRRIGATING FLUID
Filed Oct. 18, 1947
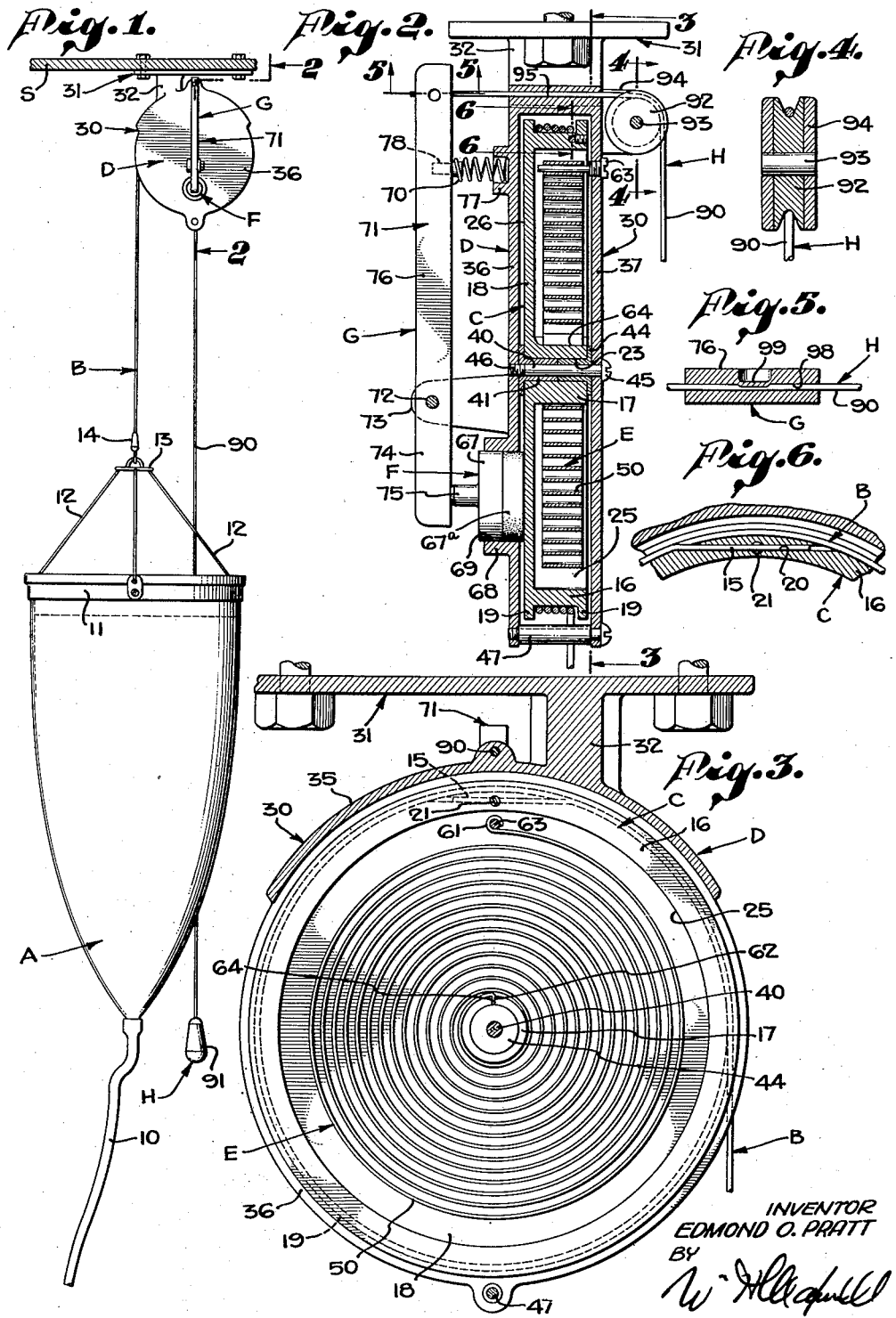
INVENTOR
EDMOND O. PRATT
BY
ATTORNEY

Patented Dec. 11, 1951

2,578,374

UNITED STATES PATENT OFFICE 2,578,374

APPARATUS FOR HANDLING IRRIGATING FLUID

Edmond O. Pratt, Los Angeles, Calif.

Application October 18, 1947, Serial No. 780,628

10 Claims. (Cl. 128—227)

This invention relates to apparatus for handling irrigating fluid and it is a general object of the invention to provide a simple, practical, easily operated structure particularly useful in operating rooms, or the like, for handling irrigating fluid such as is used in connection with surgical operations.

In operating rooms where surgical operations are performed it is important to have available a supply of irrigating fluid such as distilled water. This supply should be unfailing and the head of such supply should be subject to regulation.

It has been common practice in surgeries or operating rooms to provide a supply of irrigating fluid in a jar or like container suspended from any accessible elevated member through a makeshift rigging usually including a line arranged over a pulley and secured by tying to a convenient fixed object. Such an arrangement is often slow and cumbersome to adjust and unless handled with care it may fail or allow the jar to fall at a most critical time.

It is a general object of this invention to provide apparatus for supplying irrigating fluid in a most simple, effective, dependable manner.

Another object of the invention is to provide a liquid container suspended through a line which is handled by a spool normally set or braked against operation, so that shifting of the container can only occur when the spool is deliberately released.

Another object of the invention is to provide apparatus of the general character referred to in which vertical adjustment of the container can be effected easily and quickly and without danger of allowing the container to fall.

It is another object of the invention to provide apparatus of the character mentioned requiring only an elevated support to which the spool carrying bracket may be attached, the apparatus being free of lines or like elements to be tied to fixed objects in order to prevent lowering of the container. The only element other than the container accessible to or requiring operation by the operator is the release cord which serves to release the spool brake which brake requires deliberate operation if the spool is to be operated.

Another object of the invention is to provide apparatus of the general character referred to which is of simple, compact, inexpensive construction, convenient to install and simple and convenient to operate.

The various objects and features of my invention will be fully understood from the following detailed description of a typical preferred form and application of the invention, throughout which description reference is made to the accompanying drawings, in which:

Fig. 1 shows apparatus embodying the present invention applied to a suitable horizontal support such as a ceiling. Fig. 2 is an enlarged detailed sectional view of structure shown in Fig. 1, being a view taken as indicated by line 2—2 on Fig. 1. Fig. 3 is a transverse sectional view taken as indicated by line 3—3 on Fig. 2. Fig. 4 is an enlarged transverse sectional view taken as indicated by line 4—4 on Fig. 2. Fig. 5 is an enlarged sectional view taken as indicated by line 5—5 on Fig. 2 is an enlarged sectional view taken as indicated by line 6—6 on Fig. 2.

The apparatus embodying the present invention involves, generally, a suitable container A, a suspension line B which carries the container, a spool C on which the line B is wound, a mounting bracket D carrying the spool C, means E normally yielding tending to rotate the spool to wind the line thereof, a brake F for the spool, means G normally yieldingly holding the brake operated or set, and means H for releasing the brake against the action of means G.

The container A may be any suitable liquid carrying vessel of suitable size and shape. In the drawings I have shown a container of the type commonly used to handle irrigating fluid, the container being an open topped vessel with an outlet at its lower end to which a discharge conduit 10 is connected, which conduit may be a rubber tube or the like. The top or rim of the container A is shown equipped with a band 11 carrying a plurality of supporting members 12 which converge to a common center fitting 13 to which the suspension line B may be connected.

The suspension line B may be any suitable flexible element such as a light chain or cable. In the drawings the line B is shown provided at its lower end with a suitable fitting 14 by which it is detachably connected to the center 13. The upper end portion of the line B is wound onto the spool C and the tip end portion 15 of the line is anchored to the spool, as will be hereinafter described.

The spool C may vary widely in form and construction. However, I prefer that it be a simple element involving a rim 16, a hub 17, and a web 18 connecting the rim and hub. The rim 16 is annular in form and is provided with end flanges 19 serving to maintain the line B in position on the rim. In the case illustrated a tangential opening 20 is provided in the rim receiving the tip portion 15 of the line B and a set screw 21 is carried by the rim to clamp against and hold the tip 15 in the opening 20.

The hub 17 of the spool C is a simple elongate tubular part with a central opening or bore 23 and as shown in the drawings the hub corresponds in axial extent with the rim 16. The web 18 mounts the rim on the hub and is preferably a flat plate or disc-shaped element connecting one end of the hub 17 with the corresponding end of the rim 16, thus establishing a cavity 25 on the spool to accommodate the spring means E. In accordance with my invention the outer side 26 of the web 18 presents a flat smooth face against which the brake F operates.

The mounting bracket D involves, generally, a housing 30 carrying the spool C and a mounting flange 31 suitably connected with the housing. In the particular case illustrated the flange 31 is such as to be applied to the under side of a horizontal support S such as to a ceiling, in which case the flange is horizontally disposed while the housing is beneath the flange and is connected with the flange by a neck 32 to depend therefrom. It is to be understood that as the flange 31 is made to fit various parts or is made of special design, its relationship to the housing 30 may be varied, although in most situations a neck 32 of suitable design connecting the housing and flange serves as a satisfactory couple between these elements.

The housing 30 in accordance with my construction involves a curved or arcuate top 35 and spaced sides 36 and 37 joined to and depending from the top. In the preferred form of the invention the sides are disc-shaped or round, corresponding generally in shape and size to the spool C, although they are preferably slightly larger in diameter than the spool. The sides 36 and 37 are preferably flat parallel members disposed apart to receive the spool with suitable clearance. A mounting pin 40 extends between the sides 36 and 37 at the center of the housing and holds bushings 41 through which the spool is mounted on the pin. It is to be observed that the bushings are located between the bore 23 of hub 17 and the pin 40, and that they have end flanges 44 occurring at the ends of the hub spacing the spool from the sides 36 and 37. In the particular case illustrated the pin 40 is a simple screw member with a head 45 engaging the exterior of side 37 and a threaded end portion 46 threaded into the side 36.

The housing formed and constructed as I have described forms a holder for the spool C which holder opens downwardly as will be apparent from the drawings. In the preferred construction a tie member 47 connects the lower edge portions of the sides 36 and 37 tying them together and suitably spacing them apart relative to the spool.

The means E tends to turn the spool so the line winds onto it. The means E preferably involves an involute leaf spring 50 surrounding the hub E within the rim 16 that is located within the chamber 25, and it has one end, say its outer end 61, fixed to the housing while its inner end 62 is fixed to the hub of the spool. In the case illustrated a pin 63 projects from the inner wall of side 37 to carry the end 61 of the spring while the end 62 of the spring is shown as an inwardly turned lip part held in a radial notch 64 provided in the hub 17.

The brake F involves, generally, a brake shoe 67 carried in a suitable guideway in one of the sides of the housing. In the case illustrated a boss 68 is provided on the exterior of side 36 of the housing and a guide opening 69 is provided through the side 36 and boss 68 carrying the shoe 67. The shoe may be faced with a suitable friction facing 67a which engages the smooth flat surface 26 of the web 18.

The means G normally yieldingly holding the brake operated is shown as involving a spring 70 and a lever 71 by which the spring gains mechanical advantage over the brake shoe. The lever 71 is carried by a pivot pin 72 supported by spaced lugs 73 projecting from the outer wall of side 36 of the housing. The lever is such as to have a short arm 74 engaging a lug 75 projecting from the outer end of the brake shoe and has a long arm 76 engaged and operated by the spring 70. The spring is preferably a helical compression spring arranged under compression between the long arm 76 of the lever and the side 36 of the housing, the spring being guided by a boss 77 on the housing and a pin 78 projecting from the lever arm.

Through the arrangement just described the spring 70 has a substantial mechanical advantage over the brake shoe and in practice is of such size and strength as to bear on the brake shoe so that normally the brake shoe is set holding the spool C against operation, either under the influence of the means E or due to the weight of the container A applied through the line B.

The means H provided for releasing the brake preferably acts through the lever 71 and in the preferred form of the invention involves a simple operating line 90 fixed to the long arm 76 of the lever and arranged to have a depending portion with an operating knob 91 in a position convenient for the operator. In the case illustrated the line 90 is arranged over a pulley 92 carried on a pivot pin 93 supported by lugs 94 projecting from the side 37 of the housing. The end portion of the line 90 which connects to the lever arm 76 is passed through a guideway 95 in the top 35 of the housing. After passing over the pulley 92 the line 90 depends clear of the other parts of the structure and may be provided at its lower end with the operating knob 91 that can be conveniently grasped by a person operating the equipment. The line 90 is shown passed through an opening 98 in the lever arm 76 and a part 99 of the lever arm is deformed or depressed to grip the line in the opening, as shown in Fig. 5.

In practice any desired pre-setting or tensioning of the means E may be made. For example, if desired the means E may be pre-set so that it serves to normally wind the line B on the spool even though the container A is full of liquid, in which case the container A is elevated by means E whenever the brake is released, or the means E may be set so that it about balances or compensates for the weight of the container A and the connected conduit 10 so the container will lower only when there is some liquid therein and the brake is released, or the means E may be set to about balance the container A when the container is about half full of liquid. In the case of the latter setting when the brake is released the container may have a tendency to move one way or the other, depending upon whether it is more or less than half full. However, ordinarily it will not move fast in either direction and as the operator releases the brake through the line 90 it is a simple matter to move the container either up or down without the necessity of exerting excessive downward strain or without being burdened with lifting the entire weight of the container.

Through the construction that I have provided the means E can be so set as to, in effect, compensate for the load or weight of the container A, with the result that the operator upon releasing the brake through operation of means H can conveniently and quickly operate the container up or down, as may be desired, all without the danger of dropping the container. Should the operating line slip or fail for any reason whatever the container will not drop but rather the spring 70 acting through the lever 71 sets the brake, preventing movement of the spool and consequent movement of the container.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. Apparatus for handling irrigating fluid including, a container, a suspension line carrying the container, a spool on which the line is wound and having a line carrying rim supported by and projecting from one side of the peripheral portion of a web that is flat and which projects radially from a hub, a mounting bracket with a mounting pin rotatably supporting the hub carrying the spool, means within the spool normally yieldingly tending to rotate the spool to wind the line onto the spool, and a brake carried by the bracket and engaging said side web of the spool normally holding the spool against rotation.

2. Apparatus for handling irrigating fluid including, a container, a suspension line carrying the container, a spool on which the line is wound, a mounting bracket carrying the spool, a brake engaging the spool, a pivoted lever engaging the brake, a spring normally urging the lever to operate the brake, and manual operating means operating the lever against the action of the spring.

3. Apparatus for handling irrigating fluid including, a container, a suspension line carrying the container, a spool on which the line is wound, a mounting bracket carrying the spool, a brake engaging the spool, a pivoted lever engaging the brake, a spring normally urging the lever to operate the brake, and manual operating means operating the lever against the action of the spring including an operating line attached to the lever and having a depending portion engageable by an operator.

4. Apparatus for handling irrigating fluid including, a container, a suspension line carrying the container, a spool on which the line is wound, a mounting bracket carrying the spool, and a releasable brake normally holding the spool against rotation, the bracket including a flange and a housing carried by the flange and having an arcuate top and spaced side plates between which the spool is arranged.

5. Apparatus for handling irrigating fluid including, a container, a suspension line carrying the container, a spool on which the line is wound, a mounting bracket carrying the spool, means normally yieldingly tending to rotate the spool to wind the line onto the spool, and a releasable brake normally holding the spool against rotation, the bracket including a flange and a housing carried by the flange and having an arcuate top and spaced side plates between which the spool is arranged, said means including a spring within the spool and between the said side plates.

6. Apparatus for handling irrigating fluid including, a container, a suspension line carrying the container, a spool having a rim carrying the line and a web supporting the rim from one end, a bracket carrying the spool including a curved top and spaced side plates embracing the spool, a brake shoe carried by one side plate and engageable with the web, a lever pivoted to said side plate and engaging the shoe, a spring engaging the lever to normally operate the shoe, and an operating line connected with the lever operable to move it against the action of the spring.

7. Apparatus for handling irrigating fluid including, a container, a suspension line carrying the container, a spool having a rim carrying the line and a web supporting the rim from one end, a bracket carrying the spool including a curved top and spaced side plates embracing the spool, a brake shoe carried by one side plate and engageable with the web, a lever pivoted to said side plate and engaging the shoe, a spring engaging the lever to normally operate the shoe, an operating line attached to the lever, and a pulley carried by the bracket and guiding the operating line with a depending portion for engagement by an operator.

8. Apparatus for handling a liquid container including, a suspension line carrying the container, a spool having a rim carrying the line and a web supporting the rim from one end, a bracket carrying the spool including a curved top and spaced side plates embracing the spool, a brake shoe slidably carried by one side plate and engageable with the web, a lever pivoted to said side plate and engaging the shoe, a spring engaging the lever to normally operate the shoe, and an operating line connected with the lever operable to move it against the action of the spring.

9. Apparatus for handling irrigating fluid including, a container, a suspension line carrying the container, a spool having a rim carrying the line and a web having a hub and supporting the rim from one end only, a mounting bracket carrying the spool, means normally yieldingly tending to rotate the spool to wind the line onto the spool, and a releasable brake normally holding the spool against rotation, the bracket including a flange and a housing carried by the flange and having an arcuate top and spaced side plates between which the spool is arranged, said means including a spring within the spool and between the said side plates, and secured to the hub and one flange.

10. Apparatus for handling a liquid container including, a suspension line carrying the container, a spool having a rim carrying the line and a web supporting the rim from one end, a bracket carrying the spool including a curved top and spaced side plates embracing the spool, one of said plates having a port therethrough, a brake shoe slidably carried in the said port and engageable with the web, a lever pivoted to said side plate and engaging the shoe, a spring engaging the lever to normally operate the shoe, and an operating line connected with the lever operable to move it against the action of the spring.

EDMOND O. PRATT.

REFERENCES CITED

The following references are of record in the file of this patent:

UNITED STATES PATENTS

| Number | Name | Date |
| --- | --- | --- |
| 210,697 | Lake | Dec. 10, 1878 |
| 324,724 | Petersen | Aug. 18, 1885 |
| 771,600 | Bauer | Oct. 4, 1904 |
| 1,867,743 | Hopkins | July 19, 1932 |

FOREIGN PATENTS

| Number | Country | Date |
| --- | --- | --- |
| 13,843 | Great Britain | Oct. 28, 1886 |
| 390,342 | France | Oct. 2, 1908 |